United States Patent Office 2,850,841
Patented Sept. 9, 1958

2,850,841

METHOD OF GROWING MUSHROOM MYCELIUM AND THE RESULTING PRODUCTS

Joseph Szuecs, Yonkers, N. Y.

No Drawing. Application April 19, 1948
Serial No. 21,845

12 Claims. (Cl. 47—1.1)

This invention relates to the submerged aerobic growing of edible mushroom mycelium in a nutrient-containing liquid substrate to provide an edible mushroom product, for instance, in a ball-like form.

The cultivation of edible mushrooms is a very complex procedure, involving the preparation of compost, maintenance of proper temperature conditions, the avoidance of contamination, and the like. Moreover, the procedure is rather lengthy, requiring an over-all time of 7 or 8 weeks or more. This is reflected in the relatively high cost of edible mushrooms.

In accordance with the invention, it has been found that mushroom mycelium may be grown in a commercially advantageous manner in a relatively short time; and that the characteristic mushroom flavor and taste of the resulting mycelium product is even superior to that of the corresponding fruiting body or sporophore.

The objects achieved in accordance with the invention include the provision of an edible mushroom mycelium product of good flavor and taste; the provision of methods of growing mushroom mycelium under submerged aerobic conditions in a nutrient-containing liquid substrate; the provision of methods of rapidly growing abundant quantities of mushroom mycelium at relatively low cost and from readily available substrate material; and other objects which will be apparent as details or embodiments of the invention are set forth hereinafter.

In order to facilitate a clear understanding of the invention, the following specific embodiments are set forth.

*Example 1*

In a 1.5 gallon glass container provided with a sintered glass air distributing plate at the bottom, there in placed 1 gallon of the following nutrient-containing liquid medium, under strictly sterile conditions:

12.0 grams yeast extract (dry)
120.0 grams corn syrup 42° Bé.
16.0 grams $NH_4NO_3$
21.6 grams $KH_2PO_4$
4.9 grams $MgSO_4.7H_2O$
6.9 grams $K_2SO_4$
1.28 grams $CaCl_2.2H_2O$
0.008 gram $FeSO_4.7H_2O$
0.08 gram $MnSO_4.4H_2O$
Diluted with water to 1 gallon, and adjusted to a pH of 7 with Normal NaOH solution.

The solution is agitated with a propeller type stirrer, rotating at about 300 R. P. M., aerated at the rate of 80 cc. of air per minute through the sintered glass air distributor, and maintained at a temperature of about 25° C. It is then inoculated with 200 cc. of densely grown mycelium of Psalliota campestris grown and suspended in liquid substrate. Under these conditions, the mycelium grows in compact, ball-like form and completely fills the container in about 6 days.

*Example 2*

Following the procedure of Example 1, except using only 60.0 grams of the corn syrup, and adding 60 grams of conventional Cream of Wheat cereal, a similar growth of product is obtained in 6 days. The Cream of Wheat serves as a supporting material for the mycelium, and is partly or entirely consumed by the mycelium. The presence of such a support in the liquid medium seems to favor compact growth of the mycelium particles. In like manner, starch, wheat, or other cereal flour, or the like may be used as support material with equally satisfactory results.

*Example 3*

Following the procedure of Example 1, except that 60 grams of corn steep liquor is used instead of the yeast extract, a similar growth of product is obtained in 6 days.

When the nutrient-containing liquid medium is heated to sterilize it, a finely-divided insoluble calcium phosphate material is formed, and this serves as a support material; other equivalent calcium-containing support materials could be used, such as finely-divided calcium sulfate, calcium carbonate, dicalcium phosphate and organic calcium salts such as calcium citrate and the like. The support material is edible or eatable but need not necessarily be a common human food.

*Example 4*

Following the procedure of Example 1, except that 24 grams of homogenized lecithin (made up into an aqueous emulsion) is added, a similar growth of product is obtained in 6 days. This product has a particularly intense flavor and taste. In like manner, an intensely flavored product is obtained by using an emulsion of an edible fat or oil in place of the lecithin.

Instead of inoculating with suspended mycelium, spores or pregerminated spores may be used. A part of the harvest from one growth may be used to inoculate the medium for a second growth, breaking each ball or particle into smaller pieces if desired. This permits growing mycelium in a substantially continuous manner, recovering half or more of the product, and using the remaining product to inoculate fresh sterile medium, which may be added in the same vessel. In this way the growth time may be cut down to only about 2 days per charge.

The resulting mycelium product is separated from the liquid, e. g., by means of a centrifuge, or a Buchner funnel, and washed. The product may be used in the fresh condition in a manner similar to the fruiting body or sporophore. Alternatively, it may be conserved in soups, gravies, or the like, or dried (from a frozen state), mixed with cheese, or the like. It may be autolysed or extracted with water, or vacuum distilled to recover a concentrate or extract having the characteristic flavor and taste of edible mushrooms, e. g., essence of mushroom.

The product may be caviar-like or pearl-like pellets in appearance, or it may consist of larger lump or ball-like masses of mycelium.

Preferably, the growth is conducted at atmospheric pressure; however, other pressures may be used. The temperatures used are those at which the mycelium inoculum is accustomed to growing, and generally will lie within the range of 10° to 35° C. Lower temperatures may be used, providing the growth of the mycelium is not too slow. Higher temperatures may be used up to the temperatures at which the mycelium is killed or destroyed.

The aerobic conditions are maintained by suitable gentle and efficient agitation, or by passing air or other oxygen-containing gases through the medium, or both. Generally, from about 0.01 to about 0.02 volumes of air per minute will be passed per volume of the mixture of substrate and mycelium. A higher rate of flow may be used, but this is not required since no apparent advantage will be obtained thereby. A lower rate of air flow may be used, providing there is supplied to the growing mycelium the oxygen required in its normal growth processes and there is sufficient air flow to maintain the carbon dioxide concentration below that which will destroy the growing organism.

The exact composition of the substrate may vary over a considerable range, as the art will appreciate, but desirably should contain a carbohydrate as a principal component and should contain the usual mineral nutrient materials, i. e., nutrient compounds of K, Mg, Ca, Fe, P and S. Typical suitable carbohydrate or the like materials are hydrolyzed starch, maltose, glucose, xylose, sucrose, carboxymethylcellulose, and the like; and also hydrogenated carbohydrate materials such as mannitol, glycerol, and the like.

The nitrogen may be supplied by ammonium salts or nitrates, urea, amino acids, proteins such as casein, albumin, peptone, cottonseed meal, peanut meal, coconut meal, soybean meal, wheat bran, or their hydrolysates.

The substrate is maintained at a pH at which the mycelium is accustomed to growing, and generally this will be in the range of 6.0 to 8.0. The total concentration of dissolved material in the solution is preferably in the range of about 0.1 to about 0.25 molar. Higher concentrations may be used, especially if the mycelium is adapted ("educated") for such concentrations. Lower concentrations may be used but are not desirable for economic reasons.

A preferred method of separating essence of mushroom from the mycelium is by steam distillation under reduced pressure. The mycelium is placed in a distillation vessel, and steam is passed therethrough. The contents of the vessel are maintained under a pressure of about 10 mm. Hg and at a temperature of 45° C. The vapors are condensed, and an aqueous colorless distillate having the pure taste and flavor characteristic of the mushroom, that is, essence of mushroom, is obtained. Further details of a preferred method of making such mushroom essence may be had upon reference to my copending application Serial No. 790,227, filed December 6, 1947, now Patent 2,505,811, May 2, 1950. This essence is suitable for use in flavoring foods, and may be used advantageously to add mushroom flavor to canned mushrooms (which are known to be practically devoid of such flavor and taste).

In accordance with the invention, edible mushroom mycelium may be produced on a large scale under advantageous industrial conditions, in a relatively short time. Pure culture fermentation conditions can be more readily maintained than in the usual surface growth methods, and large surfaces of mycelium are not exposed to contamination by competing or parasitic organisms. The temperature is readily maintained at optimum growth conditions. The whole operation is relatively simple, requires relatively little labor and capital investment, and is more readily ajustable to the demand for the product.

The above procedure makes possible the growing of other edible mushrooms, e. g., the *Psalliota rodmani, Psalliota fabaceus, Pleurotus ostreatus, Polyporus umbellatus, Cantharellus cibarius, Clavaria stricta, Tricholoma rutilans, Morchella esculenta, Morchella bispora, Gyromitra esculenta,* and *Helvella elastica*.

The above specific illustrations are for illustrative purposes only and are not to be regarded as necessary limitations of the invention, which includes variations and modifications which will be apparent to those skilled in the art, except as do not come within the scope of the appended claims.

I claim:

1. A process for the production of edible mushroom mycelium by submerged growth, which comprises inoculating with edible mushroom inoculum an aqueous nutrient-containing solution including organic material, and continuously maintaining said inoculum in a state of suspension in the solution by gentle agitation to permit intact and even growth in all directions during the entire growth period while aerating the solution from below, thereby aerobically cultivating the mushroom mycelium in the form of compact and smooth ball-like pellets while completely submerged in said solution.

2. A process for the production of edible mushroom mycelium as described in claim 1 wherein the inoculum is the mushroom mycelium produced by the process of claim 1.

3. A process for the production of edible mushroom mycelium by submerged growth, which comprises inoculating with edible mushroom inoculum an aqueous nutrient-containing solution including organic material and provided with an edible particulate support material, and aerating the solution and maintaining the inoculum and the support material suspended therein by gentle agitation, thereby cultivating the mushroom mycelium on and around the support material in a submerged state.

4. A process for the production of edible mushroom mycelium as described in claim 3, wherein the inoculum is the mushroom mycelium produced by the process of claim 3.

5. A process for the production of edible mushroom mycelium by submerged growth, which comprises inoculating with edible mushroom inoculum an aqueous nutrient-containing solution including organic material and provided with an edible organic particulate support material, and aerating and gently but efficiently agitating the solution to maintain the inoculum and the support material suspended therein, thereby cultivating the mushroom mycelium on and around the support material in a submerged state, said aqueous medium including a potassium hydrophosphate in excess of about 5.0 grams per quart of medium therein.

6. A process for the production by submerged growth of edible mushroom mycelium in the form of discrete individual units having characteristic mushroom flavor, which comprises inoculating with edible mushroom inoculum an aqueous nutrient-containing solution including organic material and provided with an edible particulate nutrient support material suspended in the solution, and aerating and gently but efficiently agitating the solution to maintain the inoculum and the support material suspended therein, thereby cultivating the mushroom mycelium on and around the support material in a submerged state, said nutrient support material being at least partially consumed by the mushroom mycelium.

7. A process for the production of edible mushroom mycelium by submerged growth, which comprises inoculating with edible mushroom inoculum an aqueous nutrient-containing solution including organic material and provided with an edible organic particulate nutrient support material, and aerating and gently but efficiently agitating the solution to maintain the inoculum and the support suspended therein, thereby cultivating the mushroom mycelium on and around the support material in a submerged state, said aqueous menium having a pH in the range of about 6.0 to about 8.0 throughout the growth period.

8. A process for the production by submerged growth of edible mushroom mycelium in the form of discrete individual units having characteristic mushroom flavor, which comprises inoculating with edible mushroom inoculum an aqueous nutrient-containing solution including organic material and provided with an edible particulate nutrient support material suspended in the solution, and aerating and gently but efficiently agitating the solution to maintain the suspension of the support material and the inoculum therein, thereby cultivating the mushroom mycelium on and around the support material in a submerged state, said aqueous medium having a pH in the range of about 6.0 to about 8.0 throughout the growth period, and said nutrient support material being partially consumed by the mushroom mycelium.

9. A process for the production by submerged growth of edible mushroom mycelium in the form of discrete individual units, having characteristic mushroom flavor, which comprises inoculating with edible mushroom inoculum an aqueous nutrient-containing solution including organic material and provided with an edible particulate nutrient support material in the solution and aerating and gently but efficiently agitating the solution to maintain the inoculum and the support material suspended therein, thereby cultivating the mushroom mycelium on and around the support material in a submerged state, said aqueous medium including potassium hydrophosphate in excess of about 5.0 grams per quart of medium therein and said nutrient support material being partially consumed by the mushroom mycelium.

10. A process for the production by submerged growth of edible mushroom mycelium in the form of discrete individual units, having characteristic mushroom flavor, which comprises inoculating with edible mushroom inoculum an aqueous nutrient-containing solution including organic material and provided with an edible organic particulate nutrient support material suspended in the solution, and aerating and gently but efficiently agitating the solution to maintain the inoculum and the support material suspended therein, thereby cultivating the mushroom mycelium on and around the support material in a submerged state, said aqueous medium including potassium hydrophosphate in excess of about 5.0 grams per quart of medium therein and having a pH in the range of about 6.0 to about 8.0 during the growth period, and said nutrient support material being partially consumed by the mushroom mycelium.

11. A compact artificial edible mushroom mycelium product, having desirable form, texture and taste, containing as a core a minor proportion of fine particulate edible support material.

12. A process for growing mushroom mycelium, a foodstuff, comprising inoculating a sterile, liquid, organic-material containing nutrient medium with mushroom tissue, forcing air into the culture beneath the surface thereof, agitating the culture by stirring to disperse the air into the culture, and continuing growth under agitated, aerated, submerged conditions until a substantial amount of mycelium is produced.

References Cited in the file of this patent

UNITED STATES PATENTS

| | | |
|---|---|---|
| 1,869,517 | Sinden | Aug. 2, 1932 |
| 1,893,819 | Currie | Jan. 10, 1933 |
| 2,006,086 | May | June 25, 1935 |
| 2,044,861 | Sinden | June 23, 1936 |
| 2,132,712 | Ward | Oct. 11, 1938 |
| 2,370,961 | Hollander | Mar. 6, 1945 |

OTHER REFERENCES

Publications:

Styer: "Nutrition of the Cultivated Mushroom," published December 1930 in volume 17 of American Journal of Botany, pages 983 through 994.

Treschow: "Nutrition of the Cultivated Mushroom," published 1944 by Ejnar Munksgaard, Copenhagen, Denmark, in Dansk Botanisk Arkiv, volume 11, No. 6; pages 1 through 180 in all; pages 23 through 37, 163 through 166, and 172 through 180 relied upon.

Burkholder: "Morphogenesis of Fungus Colonies in Submerged Shaken Cultures," published July 1945 in American Journal of Botany, volume 32, pages 424 through 431.

Humfeld: "The Production of Mushroom Mycelium - - -," published April 9, 1948 in Science (Magazine), volume 107, page 373.